United States Patent [19]
Masutani

[11] Patent Number: 5,245,406
[45] Date of Patent: * Sep. 14, 1993

[54] FOURIER TRANSFORM SPECTROSCOPY AND SPECTROMETER

[75] Inventor: Koji Masutani, Tokyo, Japan

[73] Assignee: JEOL Ltd., Tokyo, Japan

[*] Notice: The portion of the term of this patent subsequent to Jun. 4, 2008 has been disclaimed.

[21] Appl. No.: 820,285

[22] Filed: Jan. 10, 1992

[30] Foreign Application Priority Data

Jan. 11, 1991 [JP] Japan ................................. 3-2279
Mar. 29, 1991 [JP] Japan ................................. 3-66705

[51] Int. Cl.$^5$ .............................................. G01B 9/02
[52] U.S. Cl. ..................................... 356/346; 356/318; 250/339; 250/458.1
[58] Field of Search ................. 356/318, 346; 250/339, 250/458.1

[56] References Cited

U.S. PATENT DOCUMENTS 4,925,307  5/1990  Cremers et al. ............... 356/318
5,021,661  6/1991  Masutani ....................... 250/339

Primary Examiner—Samuel A. Turner
Assistant Examiner—LaCharles Keesee
Attorney, Agent, or Firm—Webb, Burden, Ziesenheim & Webb

[57] ABSTRACT

A Fourier transform spectrometer for conducting Fourier transform spectroscopy. The spectrometer has a light source emitting light to a sample via a rapid scan interferometer. The transmittance of the sample varies when stimulated. A stimulus generator gives a stimulus to the sample at regular intervals of $\tau$. A delay circuit produces a trigger delayed with respect to each stimulation to control a gate circuit. Radiation emanating from the sample is detected by a detector. The output signal from this detector is gated onto a low-pass filter after a given delay $\Delta\tau$ with respect to each stimulation by the gate circuit. The gate circuit produces a digital interferogram. The low-pass filter passes only those frequency components which satisfy the condition:

$$f < \tfrac{1}{2}\tau$$

where f is the frequency at which the radiation is modulated by the interferometer. The analog output signal from the filter is converted into digital form by an A/D converter to obtain an interferogram. The interferogram is phase compensated and Fourier-transformed by a computer to derive a spectrum.

6 Claims, 9 Drawing Sheets

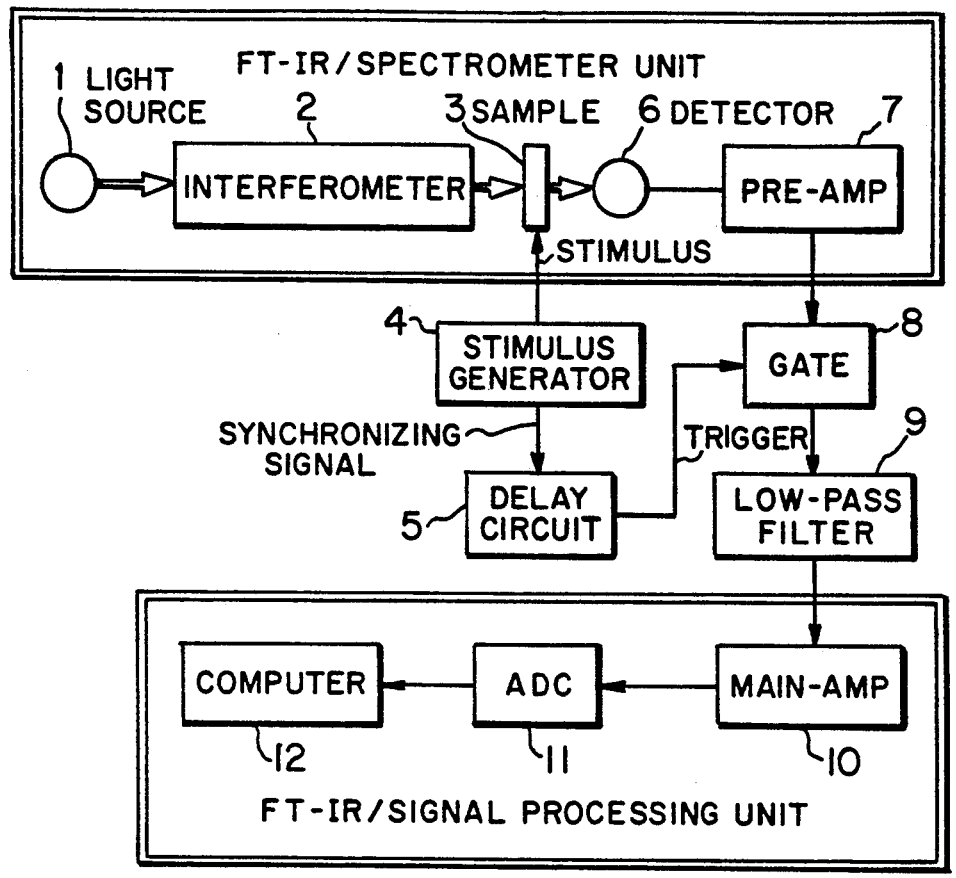
FIG. 1
FIG. 4(A)
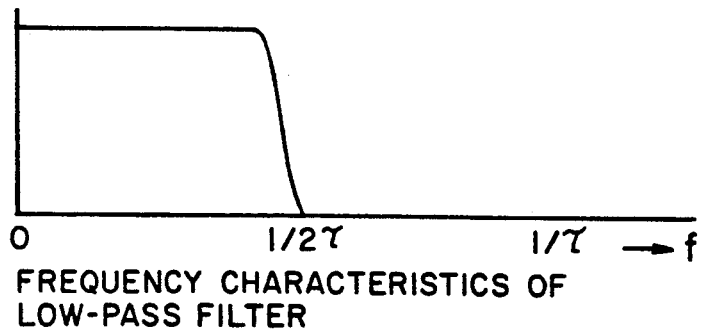
FREQUENCY CHARACTERISTICS OF LOW-PASS FILTER
FIG. 4(B)
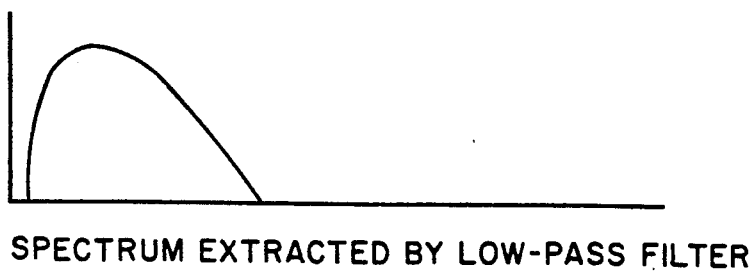
SPECTRUM EXTRACTED BY LOW-PASS FILTER

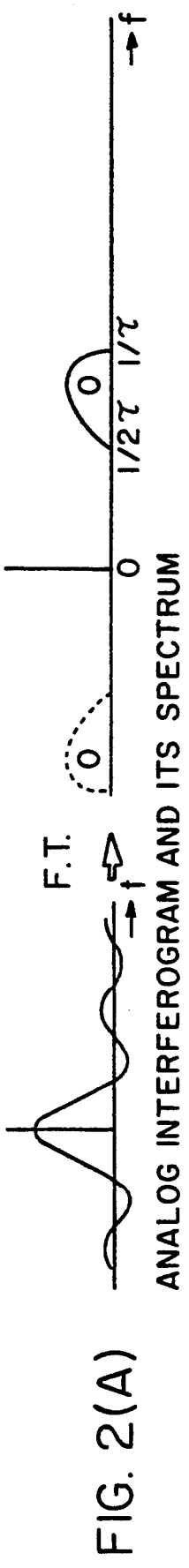
FIG. 2(A) ANALOG INTERFEROGRAM AND ITS SPECTRUM
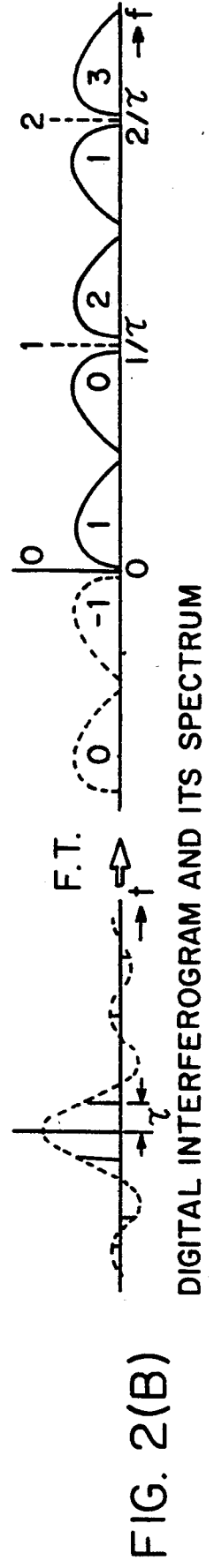
FIG. 2(B) DIGITAL INTERFEROGRAM AND ITS SPECTRUM

SINGLE STIMULUS

RESPONSE OF SAMPLE

REPEAT STIMULATION

RESPONSE OF SAMPLE

OUTPUT SIGNAL FROM INTERFEROMETER

GATE SIGNAL

DIGITAL INTERFEROGRAM

RESTORED ANALOG INTERFEROGRAM

REFERENCE SIGNAL OF INTERFEROMETER

DIGITAL INTERFEROGRAM

ANALOG INTERFEROGRAM

REFERENCE SIGNAL OF INTERFEROGRAM

OUTPUT OF A/D CONVERTER

FOURIER TRANSFORM SPECTROSCOPY AND SPECTROMETER

FIELD OF THE INVENTION

The present invention relates to a Fourier transform spectroscopy for extracting an interferogram with an interferometer and then Fourier-transforming it to obtain a spectrum of radiation of interest. The invention also relates to an instrument used in such Fourier transform spectroscopy.

BACKGROUND OF THE INVENTION

A sample which is periodically stimulated by electricity, laser radiation, or other means returns to its original state. It has been required in various applications to know the reaction during this returning process. One application resides in the case in which the properties of a liquid crystal are evaluated. For the above-described measurement, time-resolved Fourier transform spectroscopy using a Fourier transform infrared spectrometer is available.

The present applicant has already proposed a time-resolved spectroscopy utilizing Fourier transformation and an instrument used in this spectroscopy. In particular, a stimulus-generating means repeatedly gives a stimulus to a sample at intervals longer than the duration of response of the sample. Radiation emerging from the sample is detected by a detector through a rapid scan interferometer. An interferogram is obtained from the output from the detector after a given delay with respect to each stimulus. The interferogram is Fourier-transformed to derive a spectrum. In this way, the reaction of the sample which responds equally to every stimulus is investigated. The output signal from the detector is gated onto a low-pass filter after a given delay with respect to the application of each stimulus to obtain the envelope of the signal.

The present applicant has also proposed other time-resolved spectroscopy and instrument. Specifically, a pulsed light source is used as the light source. Light is emitted from this light source at the same intervals as the intervals at which a stimulus is given after a given delay with respect to each stimulus. The output from the detector is passed through a low-pass filter to obtain the envelope of the signal. In this manner, an interferogram representing the state of the sample assumed after a given delay with respect to each stimulus is obtained.

In these proposed methods and instruments, each stimulus can be given asynchronously with the reference signal produced for the interferometer. Therefore, the limitations imposed on the stimulus can be reduced greatly. Also, where a fast reaction takes place, the stimulation frequency can be increased, so that the efficiency of measurement can be enhanced. The output signal from the detector is fed to a gate circuit. Similar measurements are performed while controlling either the delay time of the gate circuit or the delay time of the pulsed light source. As a result, a series of spectra can be obtained according to successively varied delay times.

The present applicant has also proposed an instrument consisting of plural measuring systems for one sample, the measuring systems having a common optical system beginning with a light source and ending with a detector. The measuring systems have their respective delay times and are arranged in parallel. Where the sample under investigation responds equally to every stimulus repeatedly applied, the various states of the reacting sample which correspond to different delay times are measured simultaneously.

Furthermore, the present applicant has proposed a further Fourier transform spectroscopy using a pulsed light source and an instrument used in this spectroscopy. Specifically, an interferogram is taken, using an interferometer. The interferogram is Fourier-transformed to obtain a spectrum of a sample, for analyzing it. The pulsed light source emits light at intervals shorter than the sampling interval. The interferogram consisting of low-frequency components is obtained from the output from the detector, sampled, and Fourier-transformed. As a result, a spectrum of the sample which is helpful in analyzing it is derived. These proposed methods are described in U.S. patent application Ser. Nos. 07/577,636 (now U.S. Pat. No. 5,021,661) and No. 07/676,576.

These methods proposed by the present applicant assume that the intervals at which the stimulus is given or the emission interval, of the pulsed light source is shorter than the sampling interval of the interferogram, i.e., the sampling theorem states that the emission interval of the pulsed light source is shorter than the reciprocal of the square of the maximum frequency $f_{max}$ of the interferogram signal. This reciprocal is equal to or greater than the sampling interval. That is, the proposed methods assume that $\tau < \frac{1}{2}f_{max}$ or $f_{max} < \frac{1}{2}\tau$.

SUMMARY OF THE INVENTION

In view of the foregoing circumstances, it is an object of the present invention to provide a Fourier transform spectroscopy which is based on the methods already proposed by the present applicant as described above and which can be applied to cases where the interval between repeatedly given stimuli or the emission interval of a pulsed light source is longer than the reciprocal of the square of the maximum frequency $f_{max}$ of an interferogram signal, i.e., where a stimulus is repeatedly given at longer intervals of time or the emission interval of a pulsed light source is longer.

It is another object of the invention to provide an instrument for conducting the spectroscopy described in the preceding paragraph.

One aspect of the present invention lies in a Fourier transform spectroscopy consisting in causing a stimulus generating means to repeatedly give a stimulus to a sample under investigation at intervals longer than the duration of reaction of the sample, detecting the radiation emanating from the sample via a rapid scan interferometer to obtain an interferogram with a given delay with respect to each stimulation, and Fourier-transforming the interferogram to know the reaction of the sample that responds equally to every stimulus. Let f be the modulation frequency of the interferometer. Let $1/\tau$ be the repetition frequency at which the stimulus is repeatedly given. The output signal from the detector is gated onto a filter with a given delay with respect to each stimulus via a gate circuit. Those frequency components of the gate circuit which satisfy the relation $f < \frac{1}{2}$, are extracted and phase compensated. As a result, an interferogram representing the state of the sample assumed with the given delay with respect to each stimulation is derived.

A second aspect of the present invention lies in a Fourier transform spectroscopy consisting in causing a stimulus generating means to repeatedly give a stimulus to a sample under investigation at intervals longer than the duration of reaction of the sample, detecting the radiation emanating from the sample via a rapid scan interferometer to obtain an interferogram with a given delay with respect to each stimulation, and Fourier-transforming the interferogram to know the reaction of the sample that responds equally to every stimulus. Let f be the modulation frequency of the interferometer. Let $1/\tau$ be the repetition frequency at which the stimulus is repeatedly given. A pulsed light source is used as the light source for the interferometer. Light is emitted from the light source with a given delay with respect to each stimulation at the same intervals as the intervals at which the stimulus is repeatedly given. Those frequency components which satisfy the relation $f < \frac{1}{2}\tau$ are extracted from the output signal from the detector and phase compensated. In this way, an interferogram is obtained with a given delay with respect to the stimulation.

A third aspect of the invention lies in a Fourier transform spectroscopy consisting in obtaining an interferogram from the output signal from a detector through the use of a rapid scan interferometer and Fourier-transforming the interferogram to derive a spectrum of the radiation of interest. A pulsed light source is used as the light source. Let f be the modulation frequency of the interferometer. Let $1/\tau$ be the frequency of the pulsed light source. Those frequency components of the output signal from the detector which satisfy the relation $f < \frac{1}{2}\tau$ are extracted and sampled. Each of the resulting samples is phase compensated and Fourier-transformed. As a result, a spectrum of the radiation of interest is obtained.

Let f be the modulation frequency of an interferometer. Let $1/\tau$ be either the repetition frequency at which a stimulus is repeatedly given or the emission frequency of a pulsed light source. The present invention can be applied to cases where the output signal from a detector lies only within the range given by $m/2\tau < f < (m+1)/2\tau$, where m is a positive integer. Hence, the Fourier transform spectroscopy can also be applied to cases where the intervals at which a stimulus is repeatedly given or the emission interval of a pulsed light source is longer than the reciprocal of the square of the maximum frequency $f_{max}$ of an interferogram signal.

Therefore, time-resolved Fourier transform spectroscopy can be applied to samples whose duration of response to stimuli is long. Additionally, a spectrum representing the state of a sample that is reacting can be obtained, by Fourier-transforming an interferogram consisting of frequencies lower than the modulation frequency produced by an interferometer. Consequently, the arithmetic operations are easier to perform. Further, the inventive method can be easily practiced simply by correcting the phases of the interferogram and converting the wave numbers of the spectrum obtained by Fourier transformation into other wave numbers without modifying the structure of the conventional measuring apparatus.

Also, Fourier transform spectroscopy can be conducted, using a pulsed light source having a longer emission interval. This increases the kinds of light source which can be used as the pulsed light source.

Other objects and features of the invention will appear in the course of the description thereof which follows.

BRIEF DESCRIPTION OF THE DRAWINGS

FIG. 1 is a block diagram of a time-resolved Fourier transform spectrometer for carrying out a first Fourier transform spectroscopy according to the invention;

FIG. 2(A) and FIG. 2(B) are diagrams showing analog and digital interferograms and spectra contained in them;

FIG. 4(A) and FIG. 4(B) are diagrams showing the frequency-response characteristics of the low-pass filter used in the spectrometer shown in FIG. 1 and its output spectrum;

DETAILED DESCRIPTION OF THE INVENTION

Figure 3A:
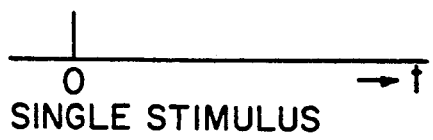
FIG. 3(A) to FIG. 3(I) are waveform diagrams illustrating the operation of the spectrometer shown in FIG. 1.

Referring to FIG. 1, there is shown a time-resolved Fourier transform spectrometer for carrying out one embodiment of Fourier transform spectroscopy according to the invention. This instrument comprises a light source 1, an interferometer 2 located after the light source 1, a stimulus generator 4 giving a stimulus to a sample 3 placed after the interferometer 2, a pulse signal delay circuit 5 disposed behind the stimulus generator 4, a detector 6 located after the sample 3 under investigation so as to detect the radiation emerging from the sample 3, a preamplifier 7 connected with the output of the detector 6, a gate circuit 8 connected with the output of the preamplifier 7, a low-pass filter 9 connected with the output of the gate circuit 8, a main amplifier 10 connected with the output of the filter 9, an analog-to-digital converter connected with the output of the main amplifier 10, and a computer 12 connected with the output of the converter 11. In the present embodiment, the transmittance of the sample 3 varies in response to the applied stimulus. It is also possible that the reflectivity or other factor of the sample 3 varies in response to the stimulus. The output of the delay circuit 5 is connected with the gate circuit 8. The light source 1, the interferometer 2, the detector 6, and the preamplifier 7 together form an FT-IR spectrometer portion. The main amplifier 10, the A/D converter 11, and the computer 12 together constitute an FT-IR signal processing portion.

The stimulus generator 4 produces stimuli or triggers at regular intervals of $\tau$ asynchronously with a reference signal produced for the interferometer 2. This reference signal is a sampling signal used to convert the resulting interferogram into digital form and to supply it into the computer. The delay circuit 5 generates a trigger which is delayed by a constant time $\Delta\tau$ with respect to the synchronizing signal produced by the stimulus generator 4. The output from the preamplifier 7 is gated to the low-pass filter 9 by the gate circuit 8 after the given delay $\Delta\tau$ with respect to each stimulus during a sufficiently short period compared with the interval $\tau$ similarly to the A/D converter 11. As a result, a comb-like interferogram or digital interferogram is obtained. The low-pass filter 9 passes only low-frequency components of the output spectrum from the gate circuit 8. As described later, this filter passes frequency components satisfying the relation $f < \frac{1}{2}\tau$. In this way, the spectrum is converted into an analog signal, or analog interferogram, having a spectrum produced after the given delay $\Delta\tau$ with respect to the application of each stimulus to the sample 3. The sample 3 investigated by the novel system responds equally to every stimulus repeatedly applied.

The output signal from the preamplifier 7 of the FT-IR spectrometer portion is supplied to the main amplifier 10 of the FT-IR signal processing portion via the gate circuit 8 and the low-pass filter 9. The output signal from this amplifier 10 is sampled by the A/D converter 11 for Fourier transformation. The stimulus generator 4 produces a signal for stimulating the sample 3 and a pulse signal synchronized to the stimulating signal. This pulse signal is applied as a trigger signal to the gate circuit 8 via the pulse signal delay circuit 5. The sample 3 is set in a sample chamber formed inside the spectrometer portion and repeatedly stimulated by the stimulating signal from the stimulus generator 4 at intervals of $\tau$. Generally, this interval $\tau$ between the successive stimuli is longer than the duration of period $\tau'$ between the instant at which a transient phenomenon of the sample 3 is started by one stimulus and the instant at which the phenomenon attenuates completely. Where the transient phenomenon begins simultaneously with the stimulus, it is necessary that the duration of the stimulus be shorter than the unit time in which the transient phenomenon is measured. Let $f_{min}$ and $f_{max}$ be the minimum and the maximum, respectively, of the frequency, or the frequency of the interferogram, at which a spectrum representing the transient phenomenon is modulated by the interferometer during each unit time of measurement. The sample is repeatedly stimulated at intervals of which satisfies the conditions:

$\tau > m/2f_{min}$     (a)

$\tau < (m+1)/2f_{max}$     (b)

where m is a positive integer. That is, the spectrum obtained from the sample 3 lies only in the range given by $m/2\tau < f < (m+1)/2\tau$ FIG. 2(A) shows the analog interferogram and its spectrum when m=1. Letting $\sigma$ (=1/$\lambda$, where $\lambda$ is the wavelength) be the wave number of the spectrum and $v$ be the speed at which the moving mirror of the interferometer 2 moves, the modulation frequency f is given by $2v\sigma$ (f=$2v\sigma$). Thus, the above-described conditions can be met by limiting the band, or the wavelength range, of the spectrum emitted from the light source 1 by means of an optical filter or by adjusting the speed of the moving mirror. As can be seen from the aforementioned conditions, one feature of this spectroscopy is that the repetition frequency $1/\tau$ is not required to be synchronized with the movement of the mirror.

Figure 3B:
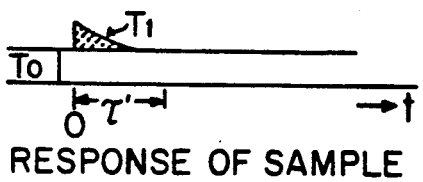
Figure 3C:
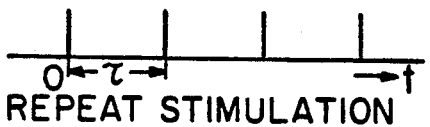
Figure 3D:
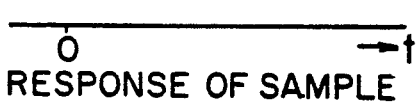
Figure 3E:

The principle on which light is dispersed by the instrument of this construction is next described. When stimulated, the sample 3 is excited with a certain probability. At the same time, it begins to be attenuated toward its original state (FIG. 3(B)). At this time, the sample 3 absorbs those wave numbers of light which show characteristic bands corresponding to the molecular structure in the transient state. The transmittance spectrum reflecting the transient state of the sample 3 which has been stimulated with a single stimulus (FIG. 3(A)) can be given by $$T(\sigma,t) = T_0(\sigma) + T_1(\sigma,t) \qquad (1)$$

Where the sample is repeatedly stimulated as shown in FIG. 3(C), the spectrum is expressed by $$T(\sigma,t) = T_0(\sigma) + T_1(\sigma,t) * III\tau(t) \qquad (2)$$

as shown in FIG. 3(D). In equation (2) above, $T_0(\sigma)$ is a transmittance spectrum independent of the stimulus, $T_1(\sigma, t)$ is a transmittance spectrum varying in response to the stimulus, $III\tau(t)$ is a comb function consisting of dirac delta functions $\delta(t)$ equispaced at intervals of $\tau$ and representing a repeated operation, and * expresses a convolution. At this time, the output signal F(x, t) from the detector 6 is given by $$F(x,t) = \int T(\sigma,t)B(\sigma)\cos 2\pi x\sigma d\sigma = F_0(x) + \int \{T_1(\sigma,t) * III\tau(t)\}B(\sigma)\cos 2\pi x\pi d\pi \qquad (3)$$

$$F_0(x) = \int T_0(\sigma)B(\sigma)\cos 2\pi x\sigma d\sigma \qquad (3')$$

where $F_0(x)$ is the output from the interferometer and represents spectral components independent of the stimulus; t is the time for which the sample is stimulated; x is the optical path difference in the interferometer 2; $\sigma$ is the wave number of the spectrum; and $B(\sigma)$ is a background spectrum obtained when the sample 3 has been removed from the sample chamber in the FT-IR spectrometer portion. The solid line in FIG. 3(E) diagrammatically shows the waveform of the output signal from the interferometer. The relation of the optical path difference x to a time variable x' is given by x=$2vt'$. However t and t' are not correlated with each other in phase, because the excitation of the sample 3 is not synchronized with the movement of the moving mirror of the interferometer 2. Specifically, the phase difference $\Delta t = t' - t$ between t and t' becomes different whenever the moving mirror is scanned. Therefore, the second term of equation (3) indicates that the interferogram assumes a different value whenever the moving mirror is scanned.

Figure 3F:
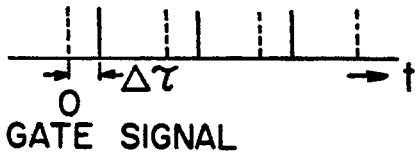

The output signal from the detector 6 is supplied to the gate circuit 8 and gated onto the low-pass filter 9 in response to the gate signal which is delayed by $\Delta\tau$ with respect to the stimulating signal from the stimulus generator 4. The timing is shown in FIG. 3(F). The duration of the gate signal is set shorter than the unit time of measurement. For simplicity, the duration of the gate signal is made infinitesimal, and the sampling processing is given by $III\tau(t)$. At this time, the output signal F'(x, t) from the gate circuit 8 is given by $$F'(x,t) = III\tau(t-\Delta\tau)[Fo(x) + \int\{T_1(\sigma,t)*III\tau(t)\}B(\sigma) \cos 2\pi x\sigma d\sigma] \quad (4a)$$

$$= III\tau(t-\Delta\tau)\int\{T(\sigma,\Delta\tau)B(\sigma) \cos 2\pi x\sigma d\sigma \quad (4b)$$

Figure 3G:
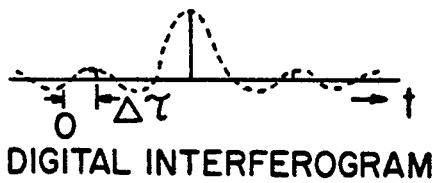

This signal is shown in FIG. 3(G). The manner in which equation (4b) is derived from equation (4a) will be described later. The integral term of equation (4b) represents the interferogram (analog interferogram) of the spectrum $T(\sigma, \Delta\tau)B(\sigma)$ obtained from the sample 3 that is in transient state after time $\Delta\tau$ passes since the sample 3 has been stimulated. The whole of equation (4b) takes the form of discrete data, i.e., digital interferogram, obtained by sampling this analog signal with $III\tau(t-\Delta\tau)$. That is, equation (4b) means that the signal derived by a measurement is time-resolved with this delay time. Since the variables t and x are asynchronous with each other, the sampling position on the interferogram differs whenever the moving mirror is scanned.

In order to get further knowledge of the output from the gate circuit 8, the term $III\tau(t-\Delta\tau)$ of equation (4b) is Fourier-transformed with respect to time t' which is correlated with the movement of the moving mirror. Then, the spectrum carried by the signal is investigated. Thus, we have.

$$\int III\tau(t-\Delta\tau) \exp(-2\pi ft')dt' = (1/\tau) \exp\{-i2\pi(\Delta\tau+\Delta t)f\}III\tau(f) \quad (5)$$

$$(1/\tau)[\int(f) + \exp\{-i2\pi(\Delta\tau+\Delta t)/\tau\}\int(f-1/\tau)+\ldots +\exp\{i2\pi(\Delta\tau+\Delta t)/\tau\}\int(f+1/\tau)+\ldots] \quad (5')$$

Equation (5) is a comb function having phase terms. The spectrum which is obtained by Fourier-transforming the integral portion of equation (4b) with respect to time is $T(f, \Delta\tau)B(f)$, where the modulation frequency f is a variable, excluding the coefficients. Therefore, the whole equation (4b) which is the output signal from the gate circuit 8 indicates that spectra obtained from $\exp\{-i2\pi(\Delta\tau+\Delta t)/\tau\}\delta(f-1/\tau)$ that is the (+1)st order term of equation (5') and from other terms appear as analog sideband signals other than the spectrum $T(f,\Delta\tau)B(f)$ that should be obtained. This term $T(f,\Delta\tau)B(f)$ is derived from $\delta(f)$ which is the zeroth order term of equation (5'). The sideband signals have carrier frequencies given by $n/\tau$, where n is an integer. Since the condition $m/2\tau<f<(m+1)/2\tau$ exists, the spectra of the sideband signals are not superimposed on each other. This can be seen from FIG. 2(B). The numerals given to the spectra in this figure indicate sidebands of the carrier frequencies of like numerals.

In accordance with the present invention, the output signal from the gate circuit 8 is passed through the low-pass filter 9 having characteristics shown in FIG. 4(A) to extract only the spectrum bearing numeral 1 (FIG. 4(B)). At this time, the filter 9 produces an analog signal, or an analog interferogram, having a spectral component to which the second term (+1st term) of equation (5') contributes. Since the first term of equation (5') have no phase components, the output signal does not bring about phase shift and is given by $$F(x, \Delta\tau) = (1/\tau) \exp\{-i2\pi(\Delta\tau+\Delta t)/\tau\}x \int T\{1/(2\nu\tau)-\sigma,\Delta\tau\}B\{1/(2\nu\tau)-\sigma\} \cos 2\pi x\sigma d\sigma \quad (6)$$

Figure 3H:
Figure 3I:
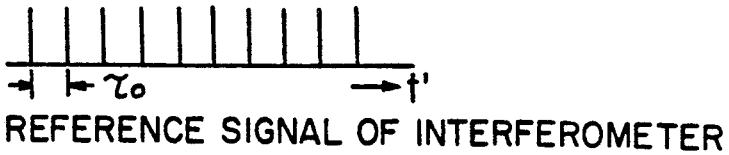

The integral term of equation (6) expresses an interferogram reflecting the transient state of the sample 3 after a lapse of time $\Delta\tau$ since the sample 3 has been stimulated. That is, the discrete signal (as shown in FIG. 3(G)) which is passed through the gate circuit 8 is restored to analog form as shown in FIG. 3(H) by the low-pass filter 9. Since equation (6) contains the phase of function of $\Delta t$, the analog signal takes a different form whenever the moving mirror of the interferometer is scanned. Therefore, accumulation of data obtained by measurements is not allowed until every data item is phase compensated. In particular, the phase is restored to the analog signal produced from the low-pass filter 9 and so interferograms are sampled with a reference signal (FIG. 3(I)) produced at intervals of $\pi o$ for the interferometer 2 for the Fourier transformation performed by the A/D converter 11. Then, they are phase compensated by the CPU 12, after which the interferograms are directly accumulated. Subsequently, they are Fourier-transformed, in the same way as in the conventional Fourier transform spectroscopy. Alternatively, the interferograms are Fourier-transformed simultaneously with phase compensation and converted into spectra. Then, they are accumulated. Let $f_{min}$ and $f_{max}$ be the minimum and the maximum, respectively, of the modulation frequency of the differential spectrum produced from the low-pass filter 9. It is necessary that the interval ,o satisfy the conditions:

$$\tau o > m/2f_{min} \text{ and } \tau o < (m+1)/2f_{max}$$

where m is zero or a positive integer.

Thus, the spectrum $T\{1/(2\nu\tau)-\sigma, \Delta\tau\}B\{1/(2\nu\tau)-\sigma\}$ is obtained. Therefore, as an example, the ratio of this spectrum to a background spectrum $B\{1/(2\nu\tau)-\sigma\}$ obtained separately by conventional Fourier transform infrared spectroscopy is taken. In this way, a transmittance spectrum $T\{1/(2\nu\tau)-\sigma, \Delta\tau\}$ is derived. Subsequently, the delay time of the variable delay circuit 5 is adjusted in the same manner to vary the delay time $\Delta\tau$ of the trigger signal to the gate circuit 8. As a result, a series of spectra is obtained with successively varied delay times. In this method, the wave numbers of the spectra obtained as described above are folded back or shifted. Therefore, it is necessary to reconstitute the wave numbers by the CPU 12, i.e., the wave numbers must be converted into other wave numbers.

As described thus far, in the novel time-resolved Fourier transform spectroscopy, transient phenomena of a sample can be measured provided that the interval between successively given stimuli is longer than the reciprocal of the square of the maximum frequency $f_{max}$ of the interferogram signal and that the transient phenomena repeat themselves asynchronously with the sampling.

The manner in which equation (4b) is obtained from equation (4a) is now described. The above-described equation (4a) assumes the form:

$$F(x,t) = III\tau(t--\Delta\tau)[Fo(x) + \int\{T_1(\sigma,t) *III\tau(t)\}B(\sigma) \cos 2\pi x\sigma d\sigma] \quad (4a)$$

Since the term $III\tau(t-\Delta\tau)$ included in equation (4a) and indicating sampling processing is a function independent of the variable $\sigma$, the term can be included in the second integral term. Now we extract only $III\tau(t-\Delta\tau)\{T_1(\sigma, t) * III\tau(t)\}$ that depends on the time variable t. Then, this term is modified. Since a comb function can be given by a sum of delta functions, we have $$III\tau(t) = \Sigma\delta(t - n\tau) \quad (A1)$$

We rewrite $III\tau(t-\Delta\tau)\{T_1(\sigma, t) * III\tau(t)\}$, using this equation (A1), where n is an integer.

$$\begin{aligned} III\tau(t - \Delta\tau)\{T_1(\sigma,t) * III\tau(t)\} \\ = \{\Sigma\delta(t - \Delta\tau - n\tau)\}\{\int T_1(\sigma,t - t')\{\Sigma\delta(t' - m\tau)\}dt'\} \\ = \{\Sigma\delta(t - \Delta\tau - n\tau)\}\{\Sigma T_1(\sigma,t - m\tau)\} \end{aligned} \quad (A2)$$

where m is also an integer. Since the interval between the successive stimuli is set longer than the lifetime $\tau'$ of the transient phenomenon of the sample, the relation $T_1(\sigma, t) = 0$ holds if $t < 0$ or $t \geq \tau$. Therefore, equation (A2) means that a signal is obtained only when n=m. Accordingly, equation (A2) can be modified as follows:

$$\begin{aligned} \{\Sigma\delta(t - \Delta\tau - n\tau)\}\{\Sigma T_1(\sigma,t - m\tau)\} \\ = \Sigma\{\delta(t - \Delta\tau - n\tau)T_1(\sigma,t - n\tau)\} \\ = \Sigma\{\delta(t - \Delta\tau - n\tau)T_1(\sigma,\Delta\tau)\} \end{aligned} \quad (A3)$$

Since $T_1(\sigma, \Delta\tau)$ is a constant, it can be taken out of the braces. Thus, $$\begin{aligned} \Sigma\{\delta(t - \Delta\tau - n\tau)T_1(\sigma,\Delta\tau)\} \\ = T_1(\sigma,\Delta\tau)\Sigma\{\delta(t - \Delta\tau - n\tau) \\ = T_1(\sigma,\Delta\tau)III\tau(t - \Delta\tau) \end{aligned} \quad (A4)$$

As a result, $$T(\sigma,t) = T_0(\sigma) + T_1(\sigma,t)$$

Using equation (1), $F_t(x, t)$ of equation (4a) can be changed into the desired form given by $$F(x,t) = III\tau(t-\Delta\tau)\int T(\sigma,\Delta\tau)B(\sigma)\cos 2\pi x\sigma d\sigma \quad (4b)$$

Figure 5:
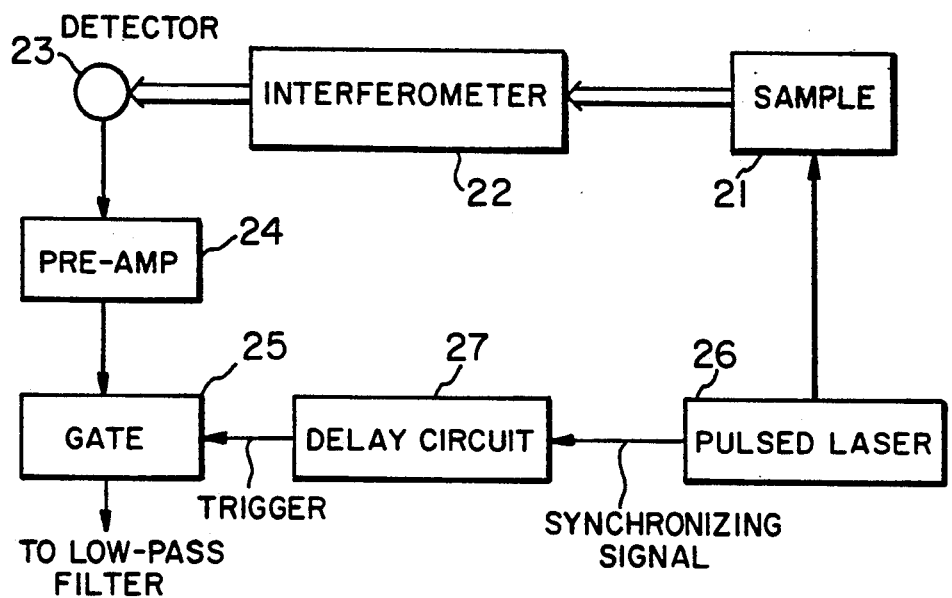
FIG. 5 is a block diagram of main portions of a fluorescence spectrophotometer to which a Fourier transform spectroscopy according to the invention is applied.

It is to be noted that the present invention is not limited to the embodiment described above. Rather, various changes and modifications are possible. For example, the function of the gate circuit may be replaced by turning on and off the detector voltage in synchronism with the trigger signal from the stimulus generator. Furthermore, the invention can be similarly applied to fluorescence spectrophotometry and Raman spectroscopy in which radiation from a pulsed laser is directed to a sample. Referring to FIG. 5, the present invention is applied to fluorescence analysis. Laser radiation from a pulsed laser 26 is directly directed to a sample 21. Radiation emanating from the sample is guided to a detector 23 via an interferometer 22. The output signal from the detector is processed in the same manner as in the embodiment described in connection with FIG. 1.

Figure 6:
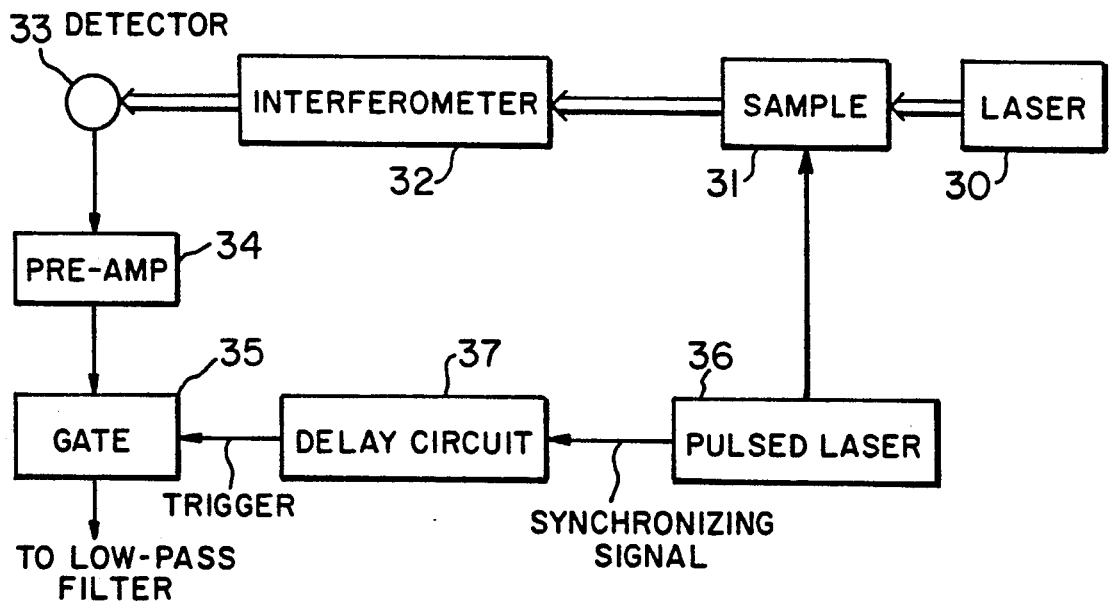
FIG. 6 is a block diagram of main portions of a Raman spectrometer to which a Fourier transform spectroscopy according to the invention is applied.

Referring next to FIG. 6, the present invention is applied to Raman spectroscopy. Radiation from a laser 30 oscillating continuously excites a sample 31. Under this condition, the sample 31 is irradiated with pulsed radiation from a pulsed laser 36 to stimulate the sample. Light emitted from the sample is guided via an interferometer 32 to a detector 33 where the resulting Raman scattering is detected. The output signal from the detector is processed in the same manner as in the embodiment illustrated in FIG. 5.

In the instruments shown in FIGS. 1, 5, and 6, the gate circuit, the low-pass filter, and other components together form one channel. It is also possible to provide a plurality of such channels. These channels are connected in parallel. The output signal from the common detector is supplied to every channel. The delay between the instant at which the sample is started to be stimulated and the instant at which every gate circuit is opened is made different from channel to channel. Thus, on the principle described in connection with FIGS. 2-4, interferograms to which different delay times with respect to the application of each stimulus are introduced are obtained simultaneously. Then, they are sampled and phase compensated. The interferograms are Fourier-transformed to simultaneously give rise to spectra reflecting different phases of a reaction process of the sample that reacts equally to every stimulus.

Figure 7:
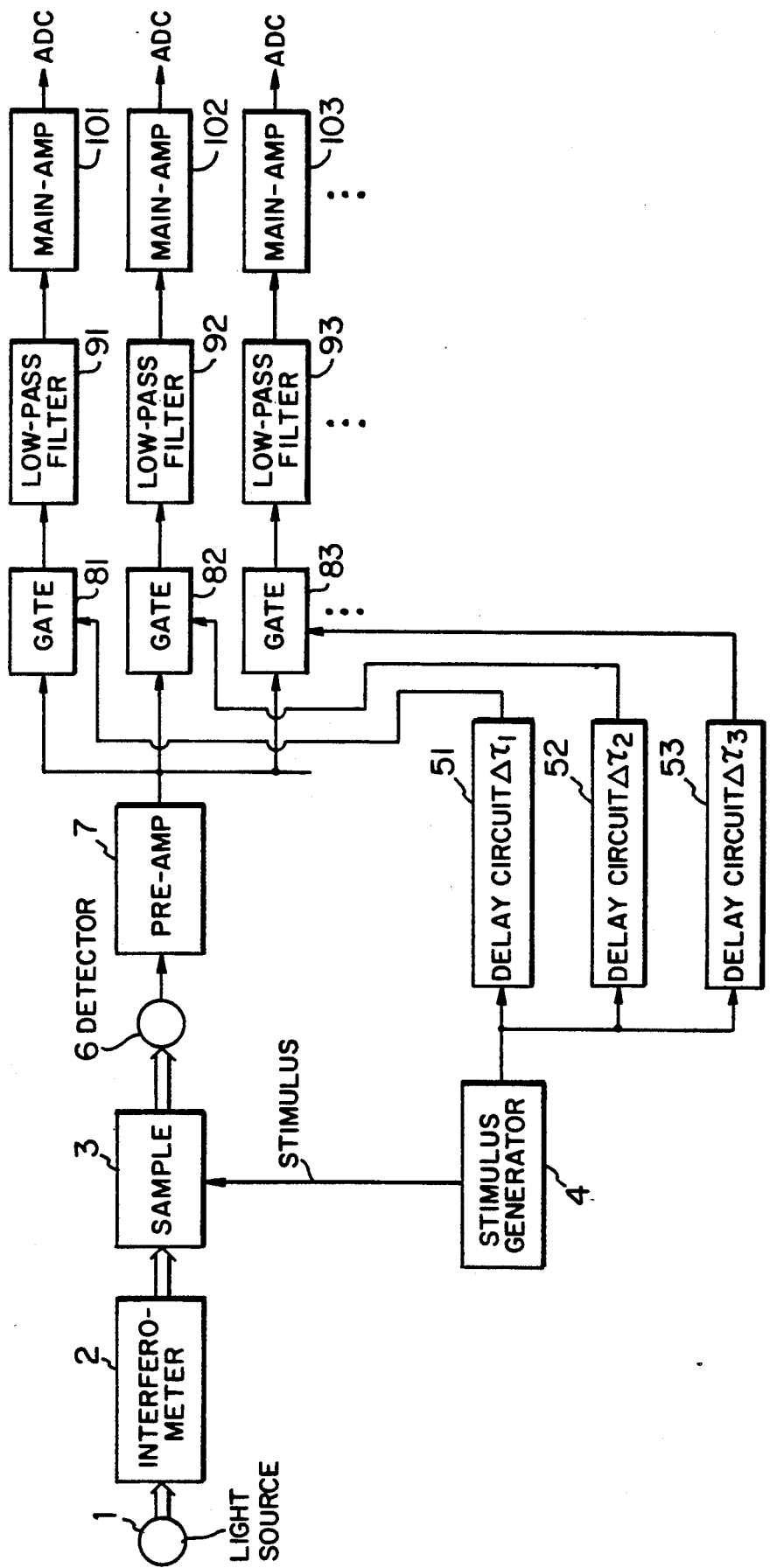
FIG. 7 is a block diagram of a Fourier transform spectrometer having multiple channels, the spectrometer being built in accordance with the invention.

Referring next to FIG. 7, there is shown an instrument carrying out such time-resolved Fourier transform spectroscopy. A stimulus generator 4 repeatedly produces impulsive stimuli at intervals of $\tau$ as shown in FIG. 3(C). A sample 3 is stimulated with these stimuli and emits light. The light emanating from the sample 3 is detected by a detector 6, which then produces a corresponding output signal. This instrument is similar to the instruments shown in FIGS. 1, 5, and 6 up to this stage. Note that the continuously oscillating laser 30 is not shown. The output signal from the detector 6 is supplied to a plurality of gate circuits 81, 82, 83, etc. arranged in parallel. The stimulus generator 4 produces a synchronizing signal to delay circuits 51, 52, 53, etc. arranged in parallel. The delay circuits 51, 52, 53, etc. have different delay times $\Delta\tau 1$, $\Delta\tau 2$, $\Delta\tau 3$, etc., and send trigger signals to the gate circuits 81, 82, 83, etc., respectively, after delay times $\Delta\tau 1$, $\Delta\tau 2$, $\Delta\tau 3$, etc., respectively, since each stimulus has been produced. Therefore, the gate circuits 81, 82, 83, etc. produce comb-like interferograms which are sampled in such a way that $\Delta\tau$ of FIG. 3(F) is replaced by $\Delta\tau 1$, $\Delta\tau 2$, $\Delta\tau 3$, etc. These are comb-like interferograms obtained by applying the detector output signal to the gate circuits only with delay times $\Delta\tau 1$, $\Delta\tau 2$, $\Delta\tau 3$, etc. with respect to the application of each stimulus. The harmonics of the comb-like interferograms excluding the zeroth order terms are filtered out by low-pass filters 91, 92, 93, etc. connected with the gate circuits 81, 82, 83, etc., respectively. The result is that the comb-like interferograms are converted into analog interferograms as shown in FIG. 3(H). Each analog interferogram is sampled at intervals of $\tau_0$ of the reference signal for the interferometer by an analog-to-digital converter installed in each channel and converted into digital form. The digital signals are accepted into a computer 12 and Fourier-transformed in the same way as in the embodiment illustrated in FIG. 1. Consequently, spectra representing the states of the sample 3 at the instants determined by the delay times $\Delta\tau 1$, $\Delta\tau 2$, $\Delta\tau 3$, etc. are obtained by one measurement. The time taken to make one measurement can be shortened as compared with the time taken for the instruments shown in FIGS. 1, 5, and 6.

In the above embodiments, the light source emits light continuously to investigate transient states of the sample after delay time $\Delta\tau$ elapses since the sample has been stimulated. The detector outputs taken with these delay times are shaped into comb-like forms by the gate circuits. As a result, digital interferograms are obtained. The novel method can also exploit a pulsed light source as the light source. This pulsed light source is made to emit light at the same intervals as the interval between the stimuli with delay Δτ with respect to each stimulation. The detector produces digital interferograms representing transient states of the sample.

Figure 8:
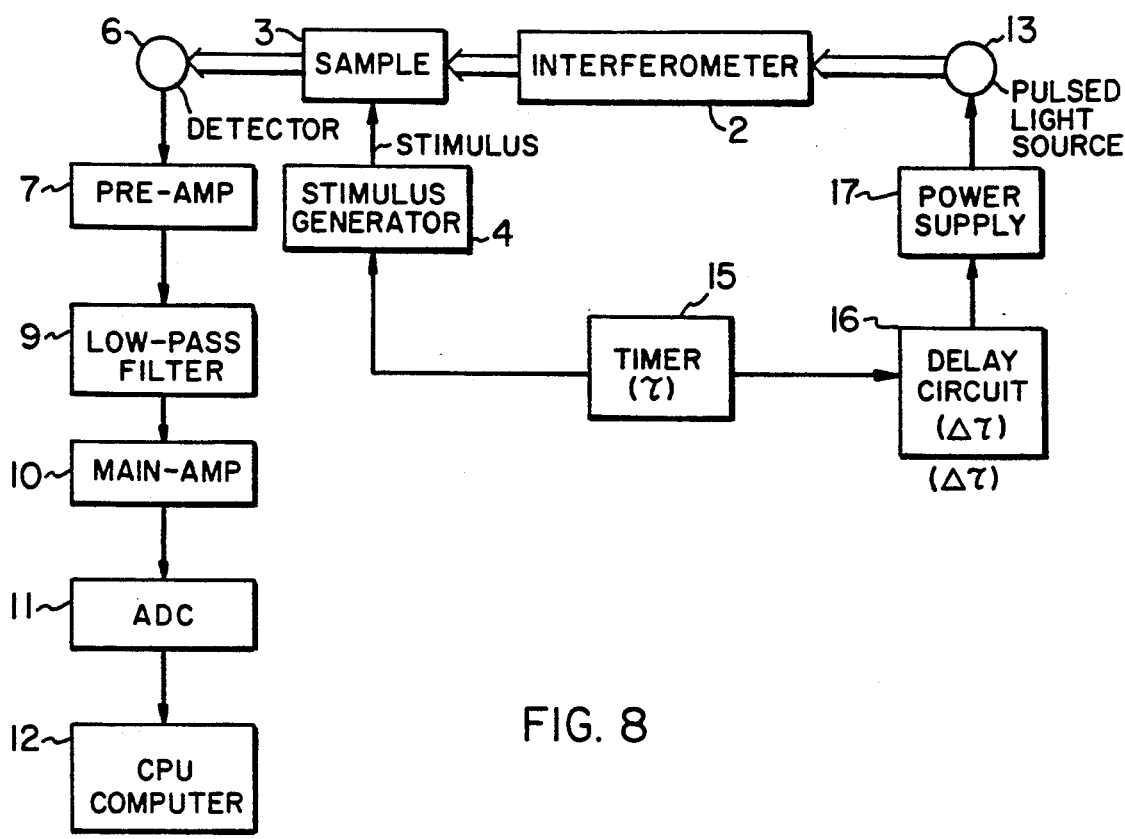
FIG. 8 is a block diagram of a fundamental Fourier transform spectrometer for carrying out a second Fourier transform spectroscopy according to the invention.

FIG. 8 shows an instrument of this structure. This instrument comprises a pulsed light source 13, an interferometer 2 illuminated by radiation emitted by the light source 13, a detector 6 placed behind a sample 3 to detect radiation emanating from the sample 3, a timer 15, a delay circuit 16 connected with the output of the timer 15, a power supply 17 for the light source, a stimulus generator 4 connected with the output of the timer 15, a preamplifier 7 connected with the output of the detector 6, a low-pass filter 9 connected with the output of the preamplifier 7, a main amplifier 10 connected with the output of the filter 9, an analog-to-digital converter 11 connected with the output of the amplifier 10, and a computer 12 connected with the output of the converter 11. Instead of opening the gate circuit to pass the signal representing the transient state after Δτ since the sample 3 has been stimulated, the pulsed light source 13 is excited after Δτ since the sample 3 has been stimulated in the structure of FIG. 8. This instrument of FIG. 8 operates similarly to the instrument of FIG. 1.

Figure 9:
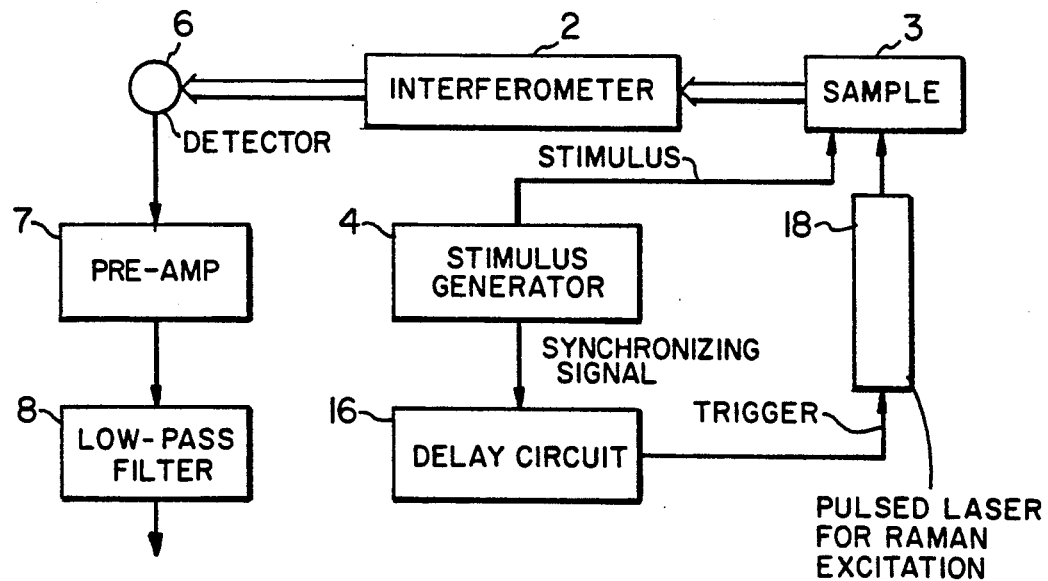
FIG. 9 is a block diagram of main portions of another Raman spectrometer to which the second Fourier transform spectroscopy according to the invention is applied.

In this embodiment, a pulsed light source is provided. The sample is stimulated. Pulsed radiation is emitted after a given delay. Instead of using such a pulsed light source, the sample may be stimulated by a Raman shift pulsed laser 18 as shown in FIG. 9. In particular, where this method is applied to a time-resolved Fourier transform Raman spectrometer, a pulsed laser 18 for Raman excitation is used instead of the light source power supply 17 shown in FIG. 8. A stimulus generator 4 gives stimuli to the sample at intervals of τ. A delay circuit 16 produces a trigger signal to the pulsed laser 18 after a given delay Δτ with respect to the synchronizing signal to control the pulsed laser 18.

Also in this case, i.e., where a pulsed light source is used, plural channels including low-pass filters may be arranged in parallel. The output signal from the common detector is applied to every channel. The delay time Δτ between the instant at which a stimulus is given to the sample and the instant at which the pulsed light source is excited is made different among the channels. Spectra reflecting different states of the sample which responds equally to every stimulus can be obtained at the same time. One example of this structure is shown in FIG. 10.

Figure 10:
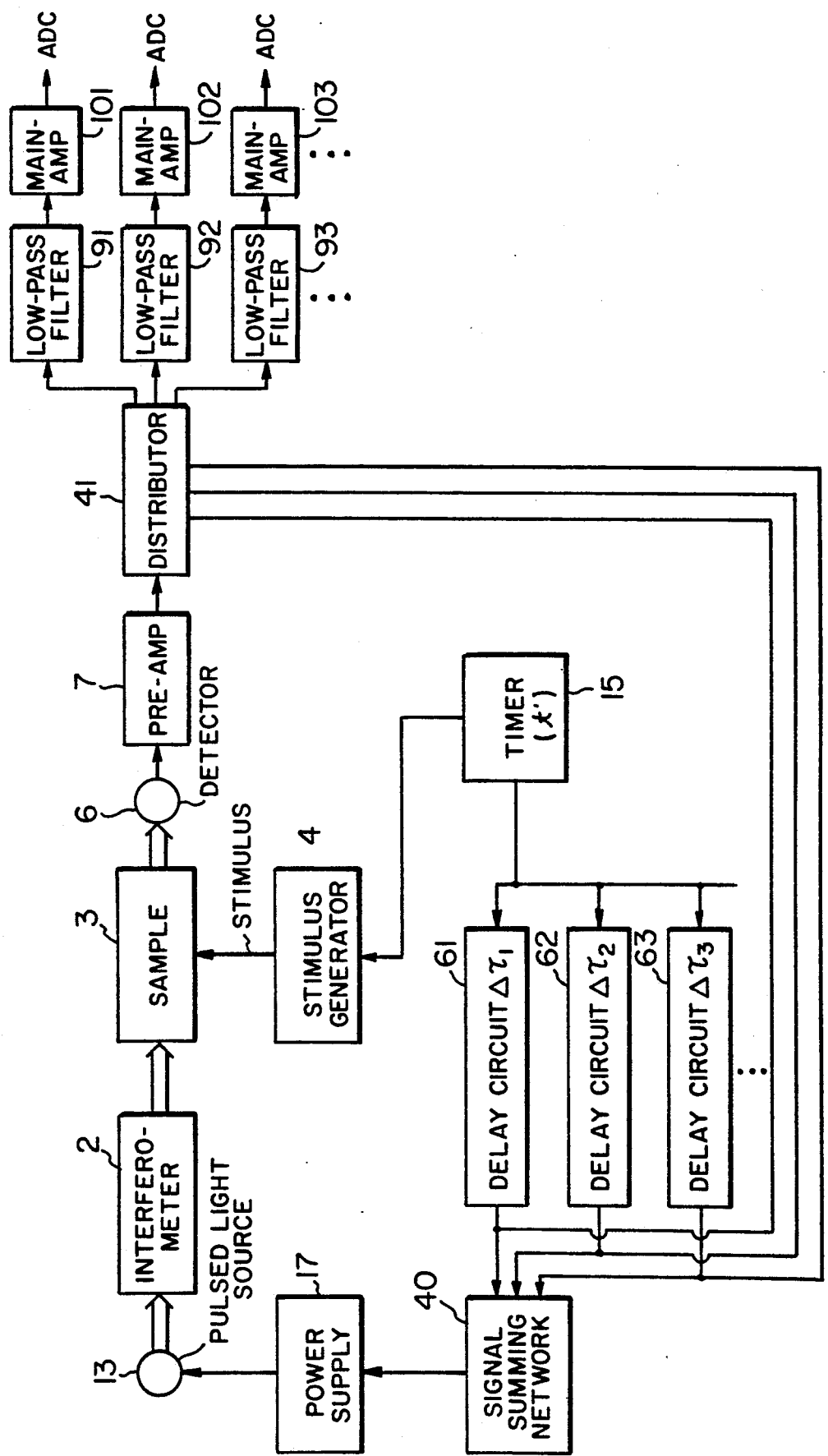
FIG. 10 is a block diagram of another Fourier transform spectrometer which has multiple channels and to which the second Fourier transform spectroscopy according to the invention is applied.

Referring to FIG. 10, a timer 15 produces clock pulses to plural delay circuits 61, 62, 63, etc., arranged in parallel. These delay circuits generate trigger signals with delay times Δτ1, Δτ2, Δτ3, etc., respectively, with respect to the generation of each stimulus. A trigger signal summing network 40 produces the sum of the trigger signals from the delay circuits 61, 62, 63, etc. The output signal from the network 40 triggers a power supply 17 for the light source with delay times Δτ1, Δτ2, Δτ3, etc. with respect to the stimulation of the sample 3, and then the light source 1 is actuated. Therefore, it substantially follows that the detector output signal is sampled only with delay times Δτ1, Δτ2, Δτ3, etc. with respect to each stimulation. In this way, comb-like interferograms are obtained. The comb-like signals are distributed via a preamplifier 7 among next stages of low-pass filters 91, 92, 93, etc. by a distributor 41 according to the delay times Δτ1, Δτ2, Δτ3, etc. with respect to each stimulation. Subsequently, in the same way as in the embodiment illustrated in FIG. 7, spectra representing the states of the sample 3 assumed after delay times Δτ1, Δτ2, Δτ3, etc. are obtained concurrently. For this reason, the time required for the measurement can also be shortened as compared with the times required by methods illustrated in FIGS. 8 and 9.

Instead of the low-pass filter used in the above-described embodiments, a band-pass filter having frequency response characteristics as shown in FIG. 2(B) may be employed. Specifically, this band-pass filter passes spectral components of the first and higher orders. As a result, spectra produced by folding back high-frequency components can be extracted.

As described thus far, the present invention is applicable to cases where the output signal from the detector caters for the condition:

$$m/2\tau < f < (m+1)/2\tau \quad (m \text{ is a positive integer})$$

where f is the modulation frequency of the interferometer and 1/τ is the frequency at which a stimulus is repeated or the frequency of the emission of the pulsed light source. In consequence, time-resolved Fourier transform spectroscopy can be applied to samples which respond at so long intervals that the spectroscopy have been heretofore impossible to apply. Furthermore, the arithmetic operations are easier to perform, because spectra representing reaction of a sample under investigation can be obtained by Fourier-transforming interferograms consisting of frequencies lower than the frequencies modulated by the interferometer. The novel method can be easily practiced simply by phase compensating interferograms and converting the wave numbers of spectra derived by Fourier transformation into other wave numbers without modifying the conventional structure of the measuring apparatus.

Figure 11:
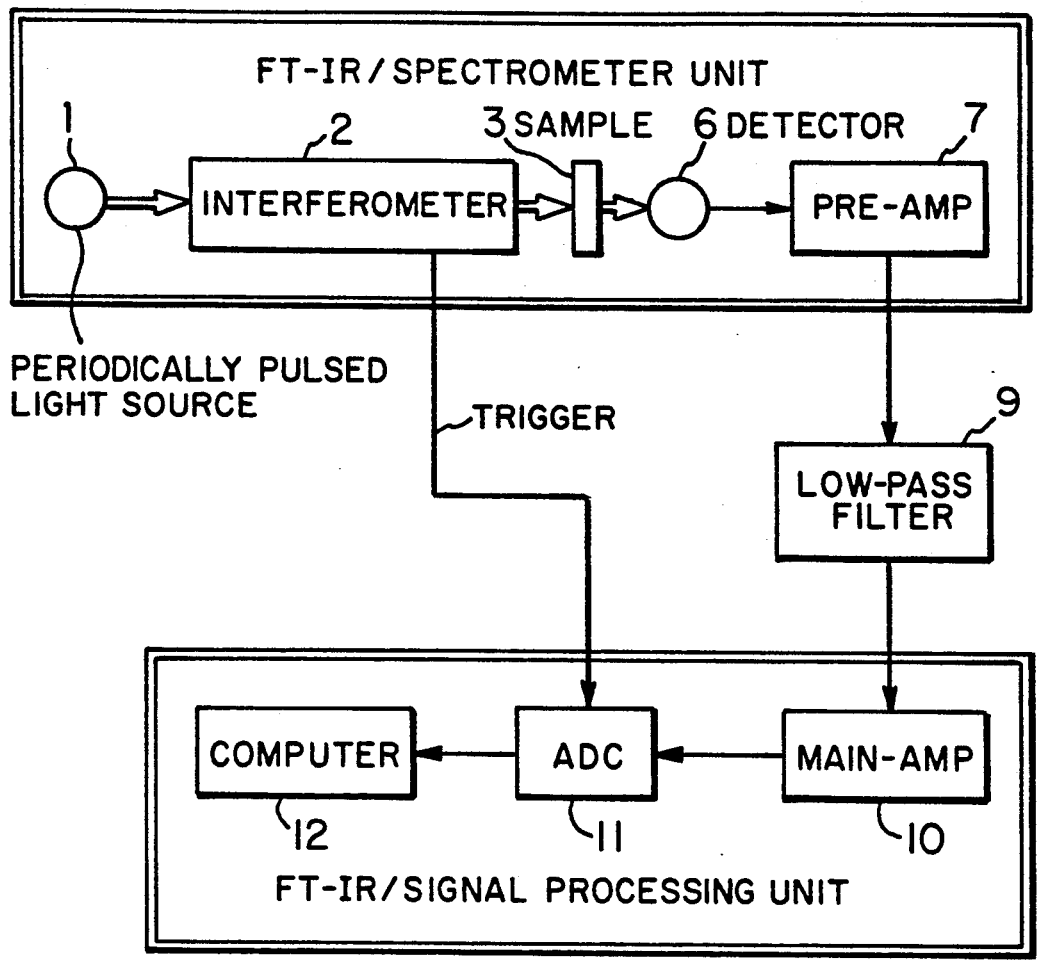
FIG. 11 is a block diagram of a further Fourier transform spectrometer for carrying out a third Fourier transform spectroscopy according to the invention.

Referring to FIG. 11, there is shown another Fourier-transform spectrometer carrying out another embodiment of the novel Fourier transform spectroscopy. This instrument is similar to the instrument shown in FIG. 1 except that a periodically pulsed light source 1, is used as a light source and that the stimulus generator 4, the pulse signal delay circuit 5, and the gate circuit 8 are omitted. The light source 1, emits constant-intensity pulsed light at regular intervals of τ asynchronously with the trigger signal applied to the A/D converter 11. This trigger signal is a sampling signal used to convert interferograms into digital form and to supply the resulting digital signals into the computer, where the data is Fourier-transformed. Instead of this periodically pulsed light source, a synchrotron orbital radiation source or a sample which exhibits Raman effect when excited with pulsed laser radiation may be used. If the intensity of the light source fluctuates, the intensity may be monitored, and the detector output may be normalized. The low-pass filter 9 acts to pass only low-frequency components of the spectra obtained from the preamplifier 7, for producing an analog signal, or analog interferogram. The passed components satisfy the relation f < ½τ (m is a positive integer) as described later. The A/D converter 11 samples the analog interferogram from the filter 9 in response to the trigger signal produced at intervals of τ0.

Therefore, the output signal from the detector 6 of the FT-IR spectrometer portion consisting of the periodically pulsed light source 1,, the interferometer 2, the detector 6, and the preamplifier 7 is applied to the main amplifier 10 of the FT-IR signal processing portion via the low-pass filter 9. The output signal from the amplifier 10 is sampled by the A/D converter 11. Let $f_{min}$ and $f_{max}$ be the minimum and the maximum, respectively, of the frequency f, or the frequency of the interferogram, at which a spectrum of measured light is modulated by the interferometer 2. The pulsed light source 1, emits light at intervals of $\tau$ which satisfies the above-described conditions, i.e., $\tau > m/2f_{min}$ and $\tau < (m+1)/2f_{max}$ where m is a positive integer. That is, the spectrum of the measured light lies only in the range given by $m/2\tau < f < (m+1)/2\tau$ FIG. 2(A) shows the spectrum when $m=1$. The modulation frequency f is given by $f=2v\sigma$, where $\sigma$ is the wave number of the spectrum ($=1/\lambda$, where $\lambda$ is wavelength), and $\lambda$ is the speed at which the moving mirror of the interferometer 2 moves. Thus, the above-described condition can be met by limiting the band, or the wavelength range, of the spectrum emitted from the light source 1' by means of an optical filter or by adjusting the speed of the moving mirror. As can be seen from the aforementioned condition, one feature of this spectroscopy is that the repetition frequency $1/\tau$ of the light source 1' is not required to be synchronized with the movement of the mirror.

Figure 12A:
FIG. 12(A) to FIG. 12(E) are waveform diagrams illustrating the operation of the spectrometer shown in FIG. 11.
Figure 12B:
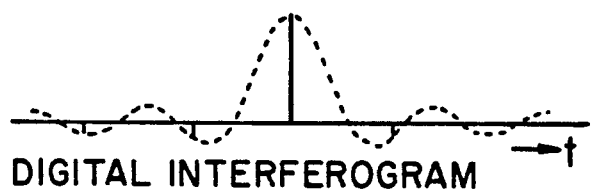

The principle on which light is dispersed by the instrument of this construction is next described. As shown in FIG. 12(A), the light source 1' emits light periodically. The light is given by a comb function $III\tau(t)$ which represents a repeated operation and in which dirac delta functions $\delta(t)$ are spaced from each other regularly at intervals of time $\tau$. Let $T(\sigma)$ be a transmittance spectrum of the sample 3. The output signal F(x, t) from the detector 6 is given by $$F(x,t) = III\tau(t) \int T(\sigma)B(\sigma) \cos 2\pi x\sigma d\sigma \qquad (11)$$

where x is the optical path difference in the interferometer 2, $\sigma$ is the wave number of the spectrum, and $B(\sigma)$ is a background spectrum obtained when the sample 3 has been removed from the sample chamber in the FT-IR spectrometer portion. The solid line in FIG. 12(B) diagrammatically shows the waveform of the output signal from the interferometer. Although the relation of the optical path difference x to the time variable t' is given by $x=2vt'$, emission of the light source 1' is not synchronized with the movement of the moving mirror of the interferometer 2. Therefore, t and t' are not correlated with each other in phase. That is, the phase difference $\Delta t = t' - t$ between t and t' assumes a different value each time the moving mirror is scanned. As such, equation (11) means that the interferogram takes a different value whenever the moving mirror is scanned.

The integral portion of equation (11) represents the interferogram (analog interferogram) of the spectrum $T(\sigma)B(\sigma)$ obtained from the sample. The whole of equation (11) takes the form of discrete data, i.e., digital interferogram, obtained by sampling this analog signal with $III\tau(t)$. Since the variables t and x are asynchronous with each other, the sampling position on the interferogram differs whenever the moving mirror is scanned.

In order to get further knowledge of the output from the detector 6, the term $III\tau(t)$ of equation (11) is Fourier-transformed with respect to time t' which is correlated with the movement of the moving mirror. Then, the spectrum of the signal is investigated. Thus, we have $$\int III\tau(t) \exp(-2\pi ft')dt' = (1/\tau) \exp(-i2\pi(\Delta t f)III1/\tau(f) \qquad (12)$$

$$= (1/\tau)\{\delta(f) + \exp\{-i2\pi\Delta t/\tau\}\delta(f-1/\tau) + \ldots + \exp(i2\pi\Delta t/\tau)\delta(f+1/\tau) + \ldots\} \qquad (12')$$

Equation (12 is a comb function having phase terms. The spectrum which is obtained by Fourier-transforming the integral portion of equation (11) with respect to time is T(f)B(f), where f is the modulation frequency, excluding the coefficients. Therefore, the whole equation (11) produced from the detector 6 indicates that the spectrum T(f)B(f) under measurement appears and that spectra obtained from $\exp(-i2\pi\Delta t/\tau)\delta(f-1/\tau)$ and other terms appear as sidebands of the carrier frequency $n/\tau$ (n is an integer indicating an order), the term $\exp(-i2\pi\Delta t/\tau)\delta(f-1/\tau)$ being the (+1)st term of equation (12'). T(f)B(f) is derived from $\delta(f)$ which is the zeroth order term of equation (12'). Since the condition $m/2\tau < f < (m+1)/2\tau$ exists, the spectra of the sideband signals are not superimposed on each other. This can be seen from FIG. 2(B). The numerals given to the spectra in this figure indicate sidebands of the carrier frequencies of like numerals.

The output signal from the detector 6 is passed through the low-pass filter 9 having characteristics shown in FIG. 4(A) to extract only the spectrum bearing numeral 1 when $m=1$. At this time, the filter 9 produces an analog signal, or an analog interferogram, having a spectral component to which the second term (+1st term) of equation (12') contributes. The spectrum to which this second term contributes is given by F(x)

$$f(x) = (1/\tau) \exp(-i2\pi\Delta t/\tau) \int T\{1/(2v\tau) - \sigma\} B\{1/(2v\tau) - \sigma\} \cos 2\pi x\sigma d\sigma \qquad (13)$$

Figure 12C:
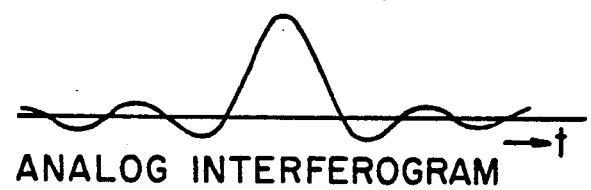
Figure 12D:
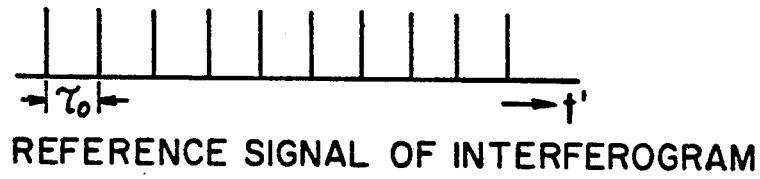
Figure 12E:
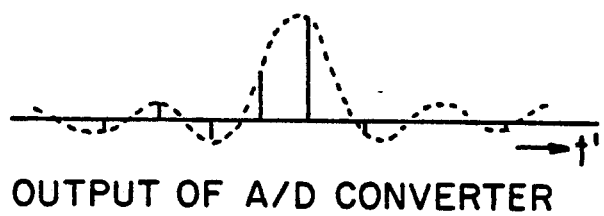

The integral term of equation (13) represents an interferogram of a spectrum obtained by folding back the spectrum of light transmitted through the sample 3. Specifically, the pulsed light source 1' emits pulsed radiation as shown in FIG. 12(A). The digital signal from the detector as shown in FIG. 12(B) is restored to analog form as shown in FIG. 12(C) by the low-pass filter 9. Since equation (13) contains the phase of a function of $\Delta\tau$, the analog signal assumes a different form whenever the moving mirror of the interferometer is scanned. Therefore, data obtained by measurements is not accumulated until every item of data is phase compensated. In particular, the phase is restored to the analog signal produced from the low-pass filter 9 and so interferograms are sampled with a reference signal (FIG. 12(D)) produced at intervals of $\tau_0$ in the interferometer 2 for the Fourier transformation performed by the A/D converter 11. Then, they are phase compensated by the CPU 12, after which the interferograms are directly accumulated. Subsequently, they are Fourier-transformed. Alternatively, the interferograms are Fourier-transformed simultaneously with phase compensation and converted into spectra. Then, they are accumulated. Let $f_{min}$ and $f_{max}$ be the minimum and the maximum, respectively, of the modulation frequency of the interferogram signal produced from the low-pass filter 9. It is necessary that the interval $\tau_0$ satisfy the conditions:

$$\tau_0 m'/2f_{min} \text{ and } \tau_0 < (m'+1)/2f_{max}$$

where m' is zero or a positive integer.

Thus, where m=1, the spectrum $T\{1/(2\nu\tau)-\sigma\}B\{1/(2\nu\tau)-\sigma\}$ is obtained. The transmittance spectrum $T\{1/(2\nu\tau)-\sigma\}$ of the sample 3 is obtained by taking the ratio of the spectrum $T\{1/(2\nu\tau)-\sigma\}$ $B\{1/(2\nu\tau)-\sigma\})$ derived as described above to a background spectrum $B\{1/(2\nu\tau)-\sigma\}$ obtained in the same manner as the foregoing. In this method, the wave numbers of the obtained spectra are folded back or shifted. Therefore, it is necessary to reconstruct the wave numbers by the computer 12, i.e., the wave numbers must be converted into other wave numbers.

As described thus far, in the novel Fourier transform spectroscopy, spectroscopic measurements can be made, using a pulsed light source whose emission interval is longer than the reciprocal of the square of the maximum frequency $f_{max}$ of the interferogram signal. That is, spectroscopic measurements can be performed, using a pulsed light source emitting light at longer intervals of time.

Figure 13:
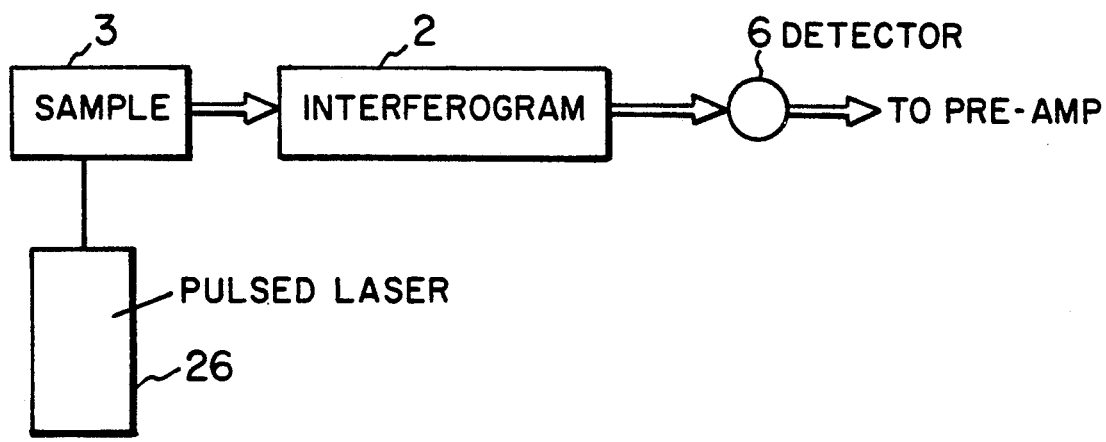
FIG. 13 is a block diagram of main portions of a yet other Raman spectrometer to which the third Fourier transform spectroscopy according to the invention is applied.

Referring next to FIG. 13, there is shown an apparatus conducting Raman spectroscopy to which the novel Fourier-transform spectroscopy is applied. A pulsed laser 26 emits light at intervals of $\tau$ to excite a sample 3. Radiation from the sample 3 which has undergone Raman scattering is directed via an interferometer 2 to a detector 6, where the radiation is detected. The output signal from the detector 6 is sent to an analog-to-digital converter 11 via a preamplifier 7, a low-pass filter 9, and a main amplifier 10, in the same way as in the instrument shown in FIG. 11, to sample the signal. Let $f_{min}$ and $f_{max}$ be the minimum and the maximum, respectively, of the frequency at which the Raman-scattered light from the sample 3 is modulated by the interferometer 2. Let $\tau$ be the emission interval of pulsed laser 26. The emission is repeated if the conditions $$\tau > m/2f_{min} \text{ and } \tau < (m+1)/2f_{max}$$

(m is a positive integer) are met. This means that the spectrum of the measured, Raman-scattered light lies only within the range given by $$m/2\tau < f < (m+1)/2\tau$$

As can be understood from the description made thus far, Fourier transform spectroscopy can be applied to cases where a pulsed light source is used and the detector output signal satisfies the condition:

$$m/2\tau < f < (m+1)/2\tau \text{ (m is a positive integer)}$$

where f is the modulation frequency of the interferometer, and $1/\tau$ is the frequency of the pulsed light source. Hence, spectroscopic measurements can be made, using a pulsed light source whose emission interval is longer than the reciprocal of square of the maximum frequency $f_{max}$ of the interferogram signal. That is, spectroscopic measurements can be performed, using a pulsed light source emitting light at longer intervals of time. Therefore, a synchrotron orbital radiation source or a sample which exhibits Raman effect when excited with pulsed laser radiation can also be employed. In this manner, the usable light sources are increased in number.

Furthermore, the time for which the sample is illuminated with light can be shortened. Also, the quantity of the illuminating light can be reduced. Consequently, Fourier-transform spectroscopy can be applied to even those samples which are adversely affected by illumination of light or continuous illumination of light. Hence, the spectroscopy can find wider application.

Having thus described my invention with the detail and particularity required by the Patent Laws, what is claimed and desired to be protected by Letters Patent is set forth in the following claims.

1. A Fourier transform spectroscopy comprising the steps of:
   causing a stimulus generator to repeatedly give a stimulus to a sample under investigation at longer intervals of time than the duration of response of the sample to each stimulus;
   illuminating the sample with radiation;
   detecting the radiation emanating from the sample by a detector via a rapid scan interferometer;
   permitting passage of the output signal from the detector with a given delay with respect to each stimulation;
   extracting frequency components satisfying the relation $$f < \frac{1}{2}\tau$$

(where f is the frequency at which the radiation is modulated by the interferometer and $1/\tau$ is the frequency of the stimuli) from the passed signal;
   sampling the extracted frequency components;
   phase compensating the resulting samples;
   obtaining an interferogram from the phase compensated samples; and
   Fourier-transforming the interferogram to obtain a spectrum representing the state of the sample assumed after the given delay time.

2. A Fourier transform spectroscopy comprising the steps of:
   causing a stimulus generator to repeatedly give a stimulus to a sample under investigation at longer intervals of time than the duration of response of the sample;
   directing radiation to the sample from a pulsed light source with a given delay with respect to each stimulation at the same intervals as the intervals at which the stimulus if given;
   detecting the radiation emanating from the sample by a detector via a rapid scan interferometer;
   extracting frequency components satisfying the relating $$f < \frac{1}{2}\tau$$

(where f is the frequency at which the radiation is modulated by the interferometer and $1/\tau$ is the frequency of the stimuli) from the output signal from the detector;
   sampling the extracted frequency components;
   phase compensating the resulting samples;
   obtaining an interferogram from the phase compensated samples; and
   Fourier-transforming the interferogram to obtain a spectrum representing the state of the sample assumed after the given delay time.

3. A Fourier transform spectroscopy comprising the steps of:
   directing radiation to a sample under investigation from a pulsed light source;

detecting the radiation emanating from the sample by a detector via a rapid scan interferometer;

extracting frequency components satisfying the relation $$f < \tfrac{1}{2}\tau$$

(where f is the frequency at which the radiation is modulated by the interferometer and $1/\tau$ is the frequency of the emission of the pulsed light source) from the output signal from the detector;

phase compensating the extracted frequency components;

sampling the phase compensated frequency components;

obtaining an interferogram from the resulting samples; and

Fourier-transforming the interferogram to obtain a spectrum of radiation of interest.

4. A Fourier transform spectrometer comprising:

a stimulus generating means for repeatedly giving a stimulus to a sample under investigation at longer intervals than the duration of response of the sample, the repetition frequency of the stimulus being set to $1/\tau$;

a light source directing radiation to the sample;

a detector for detecting the radiation emanating from the sample, via a rapid scan interferometer that modulates the radiation at frequency f;

a gating means permitting passage of the output signal from the detector with a given delay with respect to each stimulation;

a filtering means for extracting frequency components satisfying the relation $$f < \tfrac{1}{2}\tau$$

from the passed signal to produce an interferogram;

a means for phase compensating the interferogram;

a sampling means for sampling the phase compensated interferogram; and a means for Fourier-transforming the resulting samples to obtain a spectrum.

5. A Fourier transform spectrometer comprising:

a stimulus generating means for repeatedly giving a stimulus to a sample under investigation at longer intervals than the duration of response of the sample, the repetition frequency of the stimulus being set to $1/\tau$;

a pulsed light source for directing radiation to the sample with a given delay with respect to each stimulation at the same intervals as the intervals at which the stimulus is given;

a detector for detecting the radiation emanating from the sample, via a rapid scan interferometer;

a filtering means for extracting frequency components satisfying the relation $$f < \tfrac{1}{2}\tau$$

from the output signal from the detector to produce an interferogram;

a means for phase compensating the interferogram;

a sampling means for sampling the phase compensated interferogram; and a means for Fourier-transforming the resulting samples to obtain a spectrum.

6. A Fourier transform spectrometer comprising:

a pulsed light source for periodically emitting radiation to a sample under investigation at frequency $1/\tau$;

a detector for detecting the radiation emanating from the sample, via a rapid scan interferometer that modulates the radiation at frequency f;

a filtering means for extracting frequency components satisfying the relation $$f < \tfrac{1}{2}\tau$$

from the output signal from the detector to obtain an interferogram;

a means for phase compensating the interferogram;

a sampling means for sampling the phase compensated interferogram; and a means for Fourier-transforming the resulting samples to obtain a spectrum of the measured light.

* * * * *

UNITED STATES PATENT AND TRADEMARK OFFICE
CERTIFICATE OF CORRECTION

PATENT NO. : 5,245,406  
DATED : September 14, 1993  
INVENTOR(S) : Koji Masutani Page 1 of 2

It is certified that error appears in the above-indentified patent and that said Letters Patent is hereby corrected as shown below:

```
Column 2 Line 20 "," should read --τ--.

Column 2 Line 61 "½," should read --½τ--.

Column 7 Line 9 "IIIπ(t)" should read
--IIIτ(t)--.

Column 7 Line 37 Eq. (5) after "III1" insert
--/--.

Column 7 Line 40 Eq. (5') before "(1/τ)"
insert --=--.

Column 7 Lines 40-41 Esq. (5') all occurrences
of "∫" should read --δ--.

Column 8 Line 21 "πo" should read --τo--.

Column 8 Line 34 ",o" should read --τo--.

Column 8 Line 67 Eq. (4a) "(t--Δτ)" should
read --(t-Δτ)--.

Column 9 Line 18 after "interval" insert
--τ--.

Column 9 Line 40 "F," should read --F'--.

Column 9 Line 43 Eq. (4b) "F" should read
--F'--.
```

UNITED STATES PATENT AND TRADEMARK OFFICE
CERTIFICATE OF CORRECTION

PATENT NO. : 5,245,406
DATED : September 14, 1993
INVENTOR(S) : Koji Masutani

It is certified that error appears in the above-indentified patent and that said Letters Patent is hereby corrected as shown below:

Column 10 Line 8 after "delay" insert --$\Delta\tau$--.

Column 13 Line 1 "1,," should read --1',--.

Column 13 Line 9 "1," should read --1'--.

Column 13 Line 17 "$\lambda$" (third occurrence) should read --$\nu$--.

Column 14 Line 19 "$\Delta t/\pi$)" should read --$\Delta t/\tau$)--.

Column 14 Line 34 after "by" delete "F(x)".

Column 14 Line 36 Eq. (13) "f(x)" should read --F(x)--.

Column 14 Line 68 "$\tau$om'" should read --$\tau$o > m'--.

Signed and Sealed this

Fifth Day of April, 1994

BRUCE LEHMAN

*Attest:*

*Attesting Officer*     Commissioner of Patents and Trademarks